UNITED STATES PATENT OFFICE.

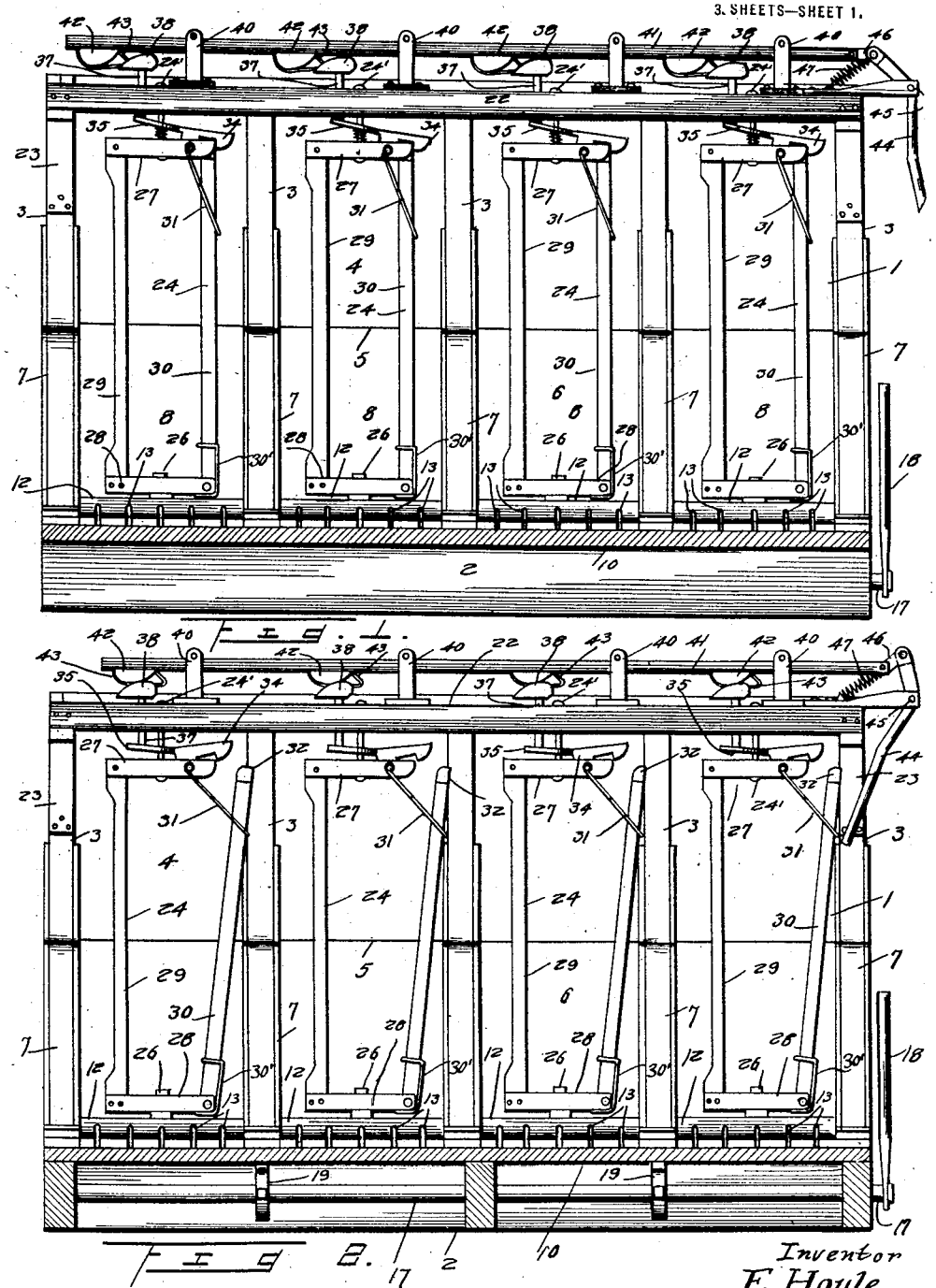

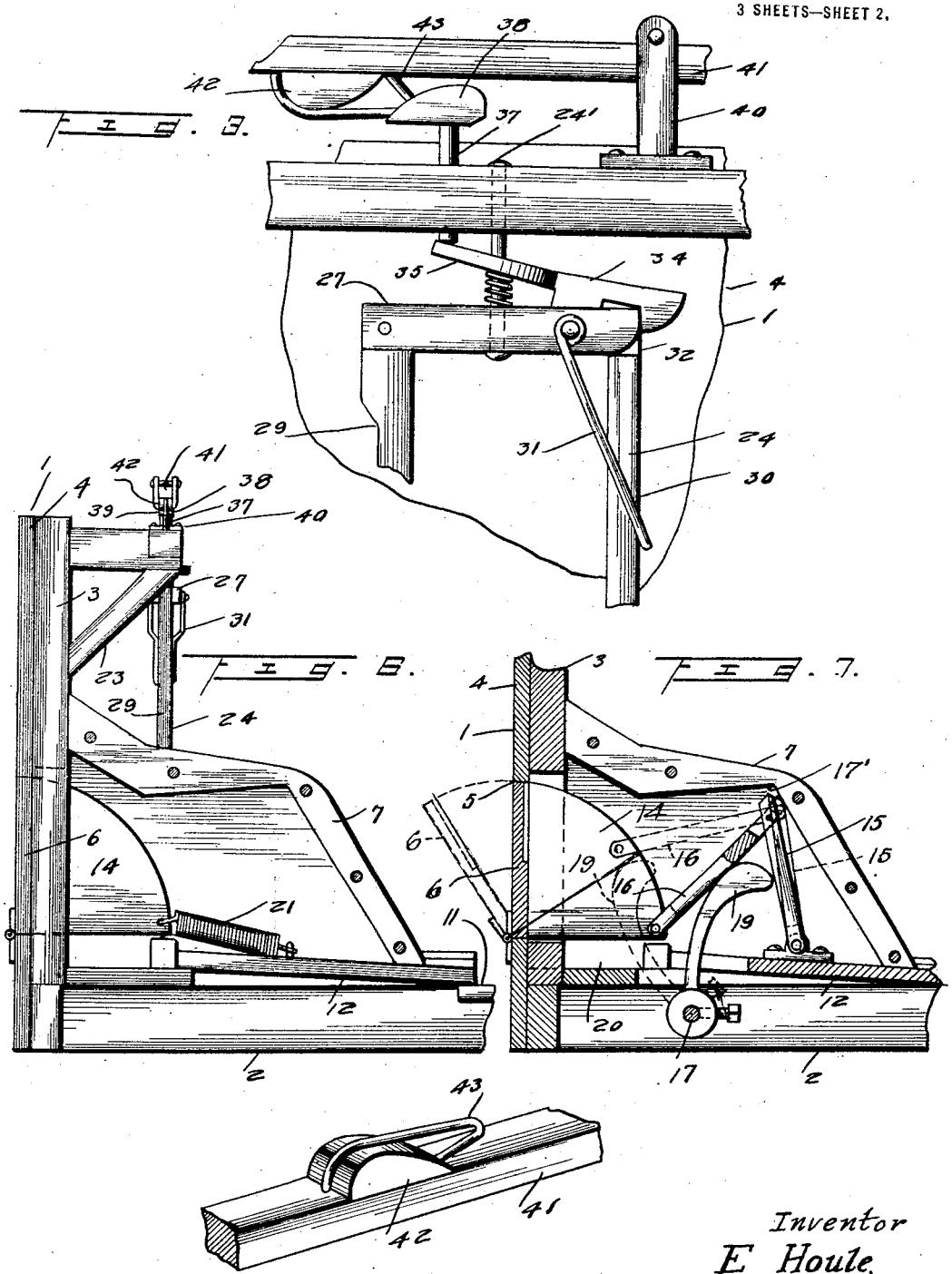

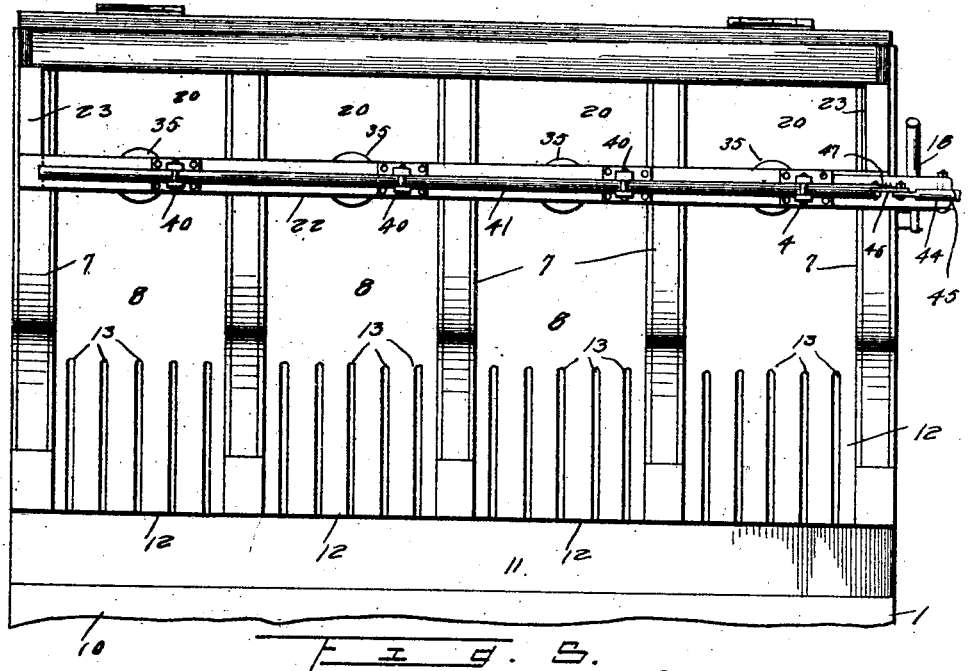
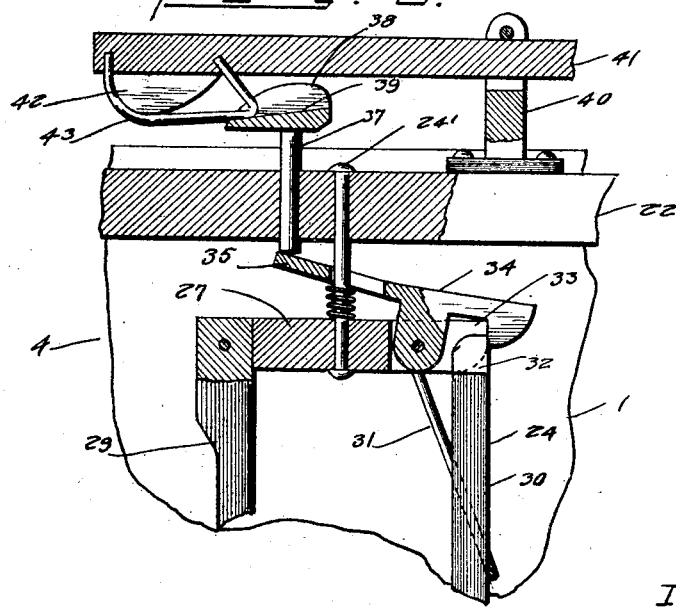

EDMOND HOULE, OF DANVERS, MASSACHUSETTS.

STANCHION.

1,409,859.  Specification of Letters Patent.  Patented Mar. 14, 1922.

Application filed January 16, 1920. Serial No. 351,893.

*To all whom it may concern:*

Be it known that I, EDMOND HOULE, a citizen of the United States, residing at Danvers, in the county of Essex and State of Massachusetts, have invented certain new and useful Improvements in Stanchions, and I do hereby declare the following to be a full, clear, and exact description of the invention, such as will enable others skilled in the art to which it appertains to make and use the same.

This invention relates to new and useful improvements in stanchions and has for its primary object the provision of means whereby the simultaneous opening of the stanchions can be effected so that each animal will be simultaneously free, thereby rendering the device especially advantageous in case of a fire, and further reducing the work of turning the animals out under ordinary conditions as it obviates the necessity of manually freeing each animal.

Another object is to provide a simplified and otherwise improved form of latch for stanchions which will especially facilitate rapid manipulation.

A still further object of this invention is the provision of stanchions of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a front elevation of animal stanchions constructed in accordance with my invention and illustrating the stanchions in a closed position.

Figure 2 is a similar view illustrating the stanchions open and the operating means in its position to free the stanchions, Figure 3 is an enlarged fragmentary front elevation of one of the stanchions and its releasing means, Figure 4 is a top plan view of the device, Figure 5 is a fragmentary longitudinal sectional view of one of the releasing means for a stanchion, Figure 6 is a transverse sectional view, illustrating the means for holding the feed door closed, Figure 7 is a similar view illustrating a portion of the operating means for the feed door, Figure 8 is a perspective view of an operating shaft.

Referring in detail to the drawings the numeral 1 indicates as an entirety a barn or stable construction for cows or other animals and includes a base or main frame 2 having secured to its forward end vertical uprights 3 to which is secured a front wall 4 provided with a doorway 5 closed by a hinged door 6. Spaced partitions 7 are secured to the main frame 1 and the uprights 3 to form stalls 8. The partitions 7 terminate short of the rear end of the frame 1 to form a passageway for the animals to enter and leave the stalls and said passage way has a flooring 10 provided with a gutter 11 extending longitudinally of the device and at the rear of the stalls. The stalls are provided with flooring 12 that inclines in the direction of the trough 11 so that the draining can readily flow into the trough and be conveyed away from the stalls. The rear portions of the flooring 12 are provided with draining groves 13 that lead to the trough 11. The partitions 7 are of hollow formation and of any desired design in outline and slidably receive segmental shaped plates 14 which are secured to the inner face of the door 6 and slide through the vertical uprights 3. Arms 15 are pivotally mounted within the partitions 7 and have pivotally connected thereto links 16 which are in turn pivoted to the plates 14. The levers or arms 15 have their upper ends reduced and project beyond the pivotal conection between said arms or levers and the links 16 to engage a shoulder 17' formed by the curvature of the partitions to limit the rearward movement of said arms or levers. A horizontally disposed operating shaft 17 is journaled in the frame 2 and has secured to one end thereof a lever 18 whereby said shaft may be oscillated. Cam-shaped elements 19 are secured to the operating shaft 17 and extend upwardly in the partitions 7 to engage the links and on forward movement of said elements they cause said links to swing upwardly which in turn opens the door 6 through the segmental plates 14 and when said cam-shaped elements 19 are in their foremonst position they engage under the segmental plates and hold the door in an open position so that feed can be placed into feed troughs 20 arranged in the forward ends of sach stall. The end segmental plates 14 have springs 21 connected thereto and to the frame instead of the links and arms or levers 15 and which springs are adapted to automatically close the door 6 when the cam-shaped elements 19 are swung rearwardly away from their respective segmental plates and links 16. It is to be noted that the feed placed within the feeding troughs 20 can only be eaten by the animal of the respective stall to the feeding trough thus preventing the animals from stealing or interfering with each other's food.

A horizontal beam 22 is supported by braces 23 over the stalls to which are pivotally connected vertically disposed stanchions 24 by bolts or rods 24' which are secured to the upper ends of the stanchions and journaled in the beam 22.

The lower ends of the stanchions 24 are pivoted to the floor of the stalls as illustrated at 26.

Each of the stanchions 24 includes upper and lower members 27 and 28 and side members 29 and 30. The side members 29 and 30 are spaced sufficiently apart to receive the neck of an animal but will prevent the animal from drawing its head between said side members.

The side member 29 is firmly secured to the upper and lower members 27 and 28 while the side member 30 is hinged to the end of the lower member 28 and is normally urged away from the end of the upper member 27 by means of a spring 30'. A yoke 31 is pivoted to the upper member 27 and slidably receives the pivoted side member 30 for limiting the movement of said side member away from the upper member 27 but will permit said side member 30 to move sufficient to permit the animal to withdraw its head from the stanchion. The upper end of the side member 30 is reduced to form an extension 32 adapted to be received by the bifurcated end 33 of the upper member 27. A catch 34 is pivoted to the upper member 27 and operates in the bifurcated end to engage the extension 32 for holding the side member 30 in engagement with the same. Circular portions 35 are formed on the catch 34 and are provided with slots to receive the bolts or rods 24' and coil springs 36 are mounted on the bolts or rods 24' and are interposed between the circular portions 35 and the upper member 27 for urging the catch into engagement with the extensions 32 on the side member 30.

Pins 37 are slidably mounted in the beam 22 and have their lower ends contacting with the circular member 35 of the catches 34 and carry at their upper ends cams 38 which are provided with grooves 39.

Brackets 40 are secured to the beam 22 and slidably support an operating rod 41 which has secured thereto cams 42 adapted to engage the cams 38 for forcing them downwardly which rocks the catches 34 on their pivots to free the side members 30 of the stanchions. Guide elements 43 are carried by the cams 42 and engage in the grooves 39 of the cams 38 for keeping the cams 38 in proper alinement with the cams 42 regardless of the position of the stanchions. A lever 44 is pivotally mounted as illustrated at 45 and has one of its ends pivoted to a link 46 which is in turn pivoted to the end of the operating rod 41. A spring 47 is secured to the link 46 and to the beam 22 for the purpose of normally urging the cams 42 away from the cams 38 or in other words to return the cams 42 to their initial position after the lever 44 has been released.

In operation, the lever 44 is swung downwardly shifting the operating rods 41 laterally causing the cams 42 to ride on the cams 38 which in turn forces them downwardly disengaging the catches 34 from the extensions 32 of the end members 30. As the end members 30 are released they swing outwardly on their pivots permitting the animals to withdraw their heads from the stanchions.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A latching means for a stanchion closure, in combination with the stanchion and a support, a rod intermediate said stanchion and support, a lever to overlap the closure pivoted to the stanchion, said lever having an opening through which the rod passes and relative to which it is enlarged so that it may fulcrum, a spring on said rod intermediate the stanchion and lever, a plunger mounted in the support and engaging the lever, and means operable to depress the plunger.

2. A latching means for a stanchion closure, in combination with the stanchion and a support, a rod intermediate said stanchion and support, a lever to overlap the closure pivoted to the stanchion, said lever having an opening through which the rod passes and relative to which it is enlarged so that it may fulcrum, a spring on said rod intermediate the stanchion and lever, a plunger mounted in the support and engaging the lever, and means operable to depress the plunger, consisting of a head on the plunger provided with a groove, a rod having a cam to extend with said groove to prevent turning of the plunger, means to move the rod to coact with the plunger, and means to restore the rod to normal position.

In testimony whereof I affix my signature in presence of two witnesses.

EDMOND HOULE.

Witnesses:
 WILLIAM F. BUSHEE,
 JOSEPH D. HOULE.